United States Patent
Bialer et al.

(10) Patent No.: US 10,908,273 B2
(45) Date of Patent: Feb. 2, 2021

(54) OBJECT VELOCITY VECTOR ESTIMATION BY MULTIPLE RADARS WITH DIFFERENT OBSERVATION ANGLES

(71) Applicant: GM GLOBAL TECHNOLOGY OPERATIONS LLC, Detroit, MI (US)

(72) Inventors: Oded Bialer, Petah Tivak (IL); Amnon Jonas, Jerusalem (IL); Tom Tirer, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 252 days.

(21) Appl. No.: 16/100,330

(22) Filed: Aug. 10, 2018

(65) Prior Publication Data
US 2020/0049811 A1 Feb. 13, 2020

(51) Int. Cl.
*G01S 13/58* (2006.01)
*G01S 13/931* (2020.01)
*G01S 13/87* (2006.01)

(52) U.S. Cl.
CPC .......... *G01S 13/589* (2013.01); *G01S 13/581* (2013.01); *G01S 13/87* (2013.01); *G01S 13/931* (2013.01)

(58) Field of Classification Search
USPC ........................................ 342/117
See application file for complete search history.

(56) References Cited

U.S. PATENT DOCUMENTS

| | | | |
|---|---|---|---|
| 7,629,920 B1 * | 12/2009 | Kuhl ........................ | G01S 13/64 342/109 |
| 2019/0049580 A1 * | 2/2019 | Natroshvili ........... | G01S 17/931 |
| 2019/0265347 A1 * | 8/2019 | Wintermantel ......... | G01S 7/354 |

* cited by examiner

*Primary Examiner* — Erin F Heard
*Assistant Examiner* — Michael W Justice
(74) *Attorney, Agent, or Firm* — Cantor Colburn LLP

(57) ABSTRACT

A vehicle, system and method of estimating a velocity of an object with respect to the vehicle is disclosed. The system includes a plurality of radars associated with the vehicle and a processor. The plurality of radars provide a coarse estimate of the velocity. The processor obtains a plurality of velocity hypotheses based on the coarse estimate of the velocity of the object, determines a likelihood for each of the plurality of velocity hypotheses, and chooses a velocity hypothesis having as the estimate of velocity based on the determined likelihood.

20 Claims, 7 Drawing Sheets

OBJECT VELOCITY VECTOR ESTIMATION BY MULTIPLE RADARS WITH DIFFERENT OBSERVATION ANGLES

INTRODUCTION

The subject disclosure relates to radar systems and methods for determining a velocity of an object in a radar system and, in particular, to determining a two-dimensional velocity vector of the object using multiple radars.

A radar system on a vehicle detects objects around the vehicle in order to enable the vehicle to navigate around the object without making contact. A simple radar system obtains Doppler measurements that determine a radial velocity of the object with respect to the vehicle. Objects generally are not just moving toward or away from the vehicle (i.e., radially) but are also moving from side to side (i.e., tangentially). However, a single radar cannot detect a tangential component of the velocity vector. A single radar measuring only radial velocity provides incomplete information about the velocity of the object. Accordingly, it is desirable to employ a radar system that completely determines a two-dimensional velocity vector for an object.

SUMMARY

In one exemplary embodiment, a method of estimating a velocity of an object is disclosed. The method includes obtaining a plurality of velocity hypotheses based on a coarse estimate of the velocity of the object, determining a likelihood for each of the plurality of velocity hypotheses, and choosing a velocity hypothesis from the plurality of velocity hypotheses as the estimate of velocity based on the determined likelihood.

In addition to one or more of the features described herein, determining the likelihood of a selected velocity hypothesis further comprises forming a likelihood map for the velocity hypothesis. The likelihood score for the selected velocity hypothesis is a difference between and entropy term of the likelihood map and an energy of the pixels of the likelihood map. The method further includes choosing the velocity hypothesis for which the likelihood score is an extremum as the estimate of the velocity. The method further includes obtaining a measurement of Doppler frequency for the object at each of a plurality of spaced apart radars, and determining the coarse estimate of the velocity of the object from the Doppler frequencies. The method further includes determining the coarse estimate of velocity from the Doppler frequencies and angular locations of the object with respect to each of the plurality of spaced-apart radars. The method further includes generating a search grid from the coarse estimate and selecting the velocity hypothesis from an area within the search grid.

In another exemplary embodiment, a system for estimating a velocity of an object with respect to a vehicle is disclosed. The system includes a plurality of radars associated with the vehicle and a processor. The plurality of radars provide a coarse estimate of the velocity. The processor obtains a plurality of velocity hypotheses based on the coarse estimate of the velocity of the object, determines a likelihood for each of the plurality of velocity hypotheses, and chooses a velocity hypothesis as the estimate of velocity based on the determined likelihood.

In addition to one or more of the features described herein, the processor is further configured to form a likelihood map for a selected velocity hypothesis. The processor is further configured to determine a likelihood score for the selected velocity hypothesis from a difference between and entropy term of the likelihood map and an energy of the pixels of the likelihood map. The processor further chooses the velocity hypothesis for which the likelihood score is an extremum as the estimate of the velocity. The plurality of radars obtain measurements of Doppler frequency for the object, and the processor is configured to determine the coarse estimate of the velocity of the object from the Doppler frequencies. The processor is further configured to determine the coarse estimate of velocity from the Doppler frequencies and angular locations of the object with respect to each of the plurality of spaced-apart radars. The processor is configured to generate a search grid from the coarse estimate and select the velocity hypotheses from an area within the search grid.

In yet another exemplary embodiment, a vehicle is disclosed. The vehicle includes a plurality of radars and a processor. The processor configured to generate a search grid based on the coarse estimate of the velocity of the object obtained using the plurality of radars, determine a likelihood for a plurality of velocity hypotheses within the search grid, and choose a velocity hypotheses from the plurality of velocity hypotheses as the estimate of velocity based on the determined likelihood of the velocity hypothesis.

In addition to one or more of the features described herein, the processor is further configured to form a likelihood map for a selected velocity hypothesis. The processor is further configured to determine a likelihood score for the selected velocity hypothesis from a difference between and entropy term of the likelihood map and an energy of the pixels of the likelihood map, and choose the velocity hypothesis for which the likelihood score is an extremum as the estimate of the velocity. The plurality of radars obtain measurements of Doppler frequency for the object, and the processor is configured to determine the coarse estimate of the velocity of the object from the Doppler frequencies. The processor is further configured to determine the coarse estimate of velocity from the Doppler frequencies and angular locations of the object with respect to each of the plurality of spaced-apart radars. The processor is configured to generate a search grid from the coarse estimate and select the velocity hypothesis from an area within the search grid.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
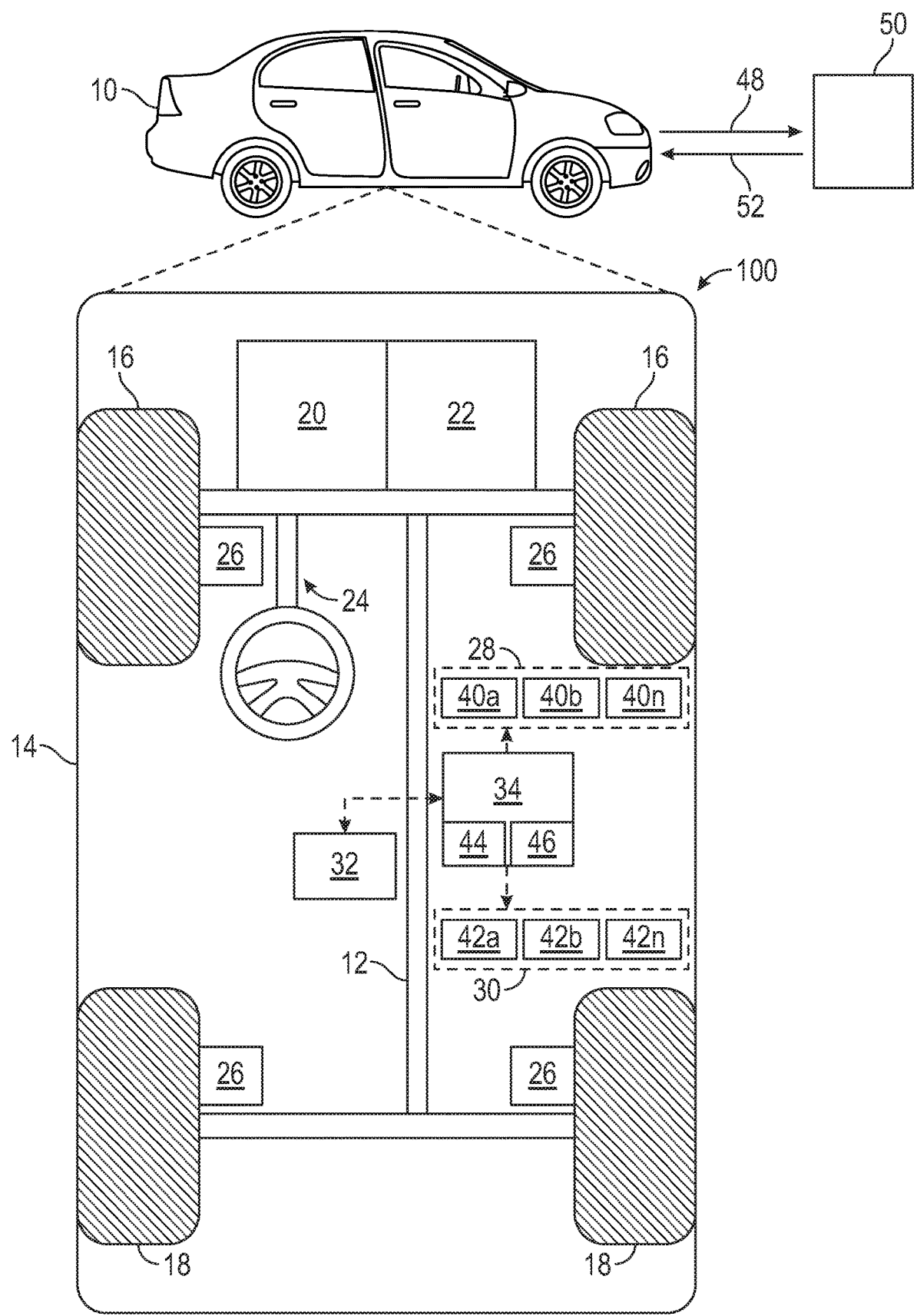
FIG. 1 shows a vehicle with an associated trajectory planning system in accordance with various embodiments.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 10 with an associated trajectory planning system depicted at 100 in accordance with various embodiments. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14.

In various embodiments, the vehicle 10 is an autonomous vehicle and the trajectory planning system 100 is incorporated into the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, and at least one controller 34. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. In various embodiments, the vehicle 10 includes a radar system including an array of radars, the radars being located at various locations along the vehicle 10. In operation, a radar sends out an electromagnetic pulse 48 that is reflected back at the vehicle 10 by one or more objects 50 in the field of view of the radar. The reflected pulse 52 appears as one or more detections at the radar.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as ventilation, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which includes an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

The trajectory planning system 100 navigates the autonomous vehicle 10 based on a determination of objects and/or their locations within the environment of the vehicle. In various embodiments the controller 34 operates a plurality of radars at various locations on the vehicle 10 to determine a velocity vector of an object using the methods disclosed herein. The determined velocity vector can be used either alone or in combination with parameters such as range, azimuth and/or elevation of the object 50 in order to navigate the vehicle 10. Upon determining various radar parameters of the object, such as range, azimuth, elevation, velocity, etc., the controller 34 can operate the one or more actuator devices 42a-n, the propulsion system 20, transmission system 22, steering system 24 and/or brake 26 in order to navigate the vehicle 10 with respect to the object 50.

Figure 2:
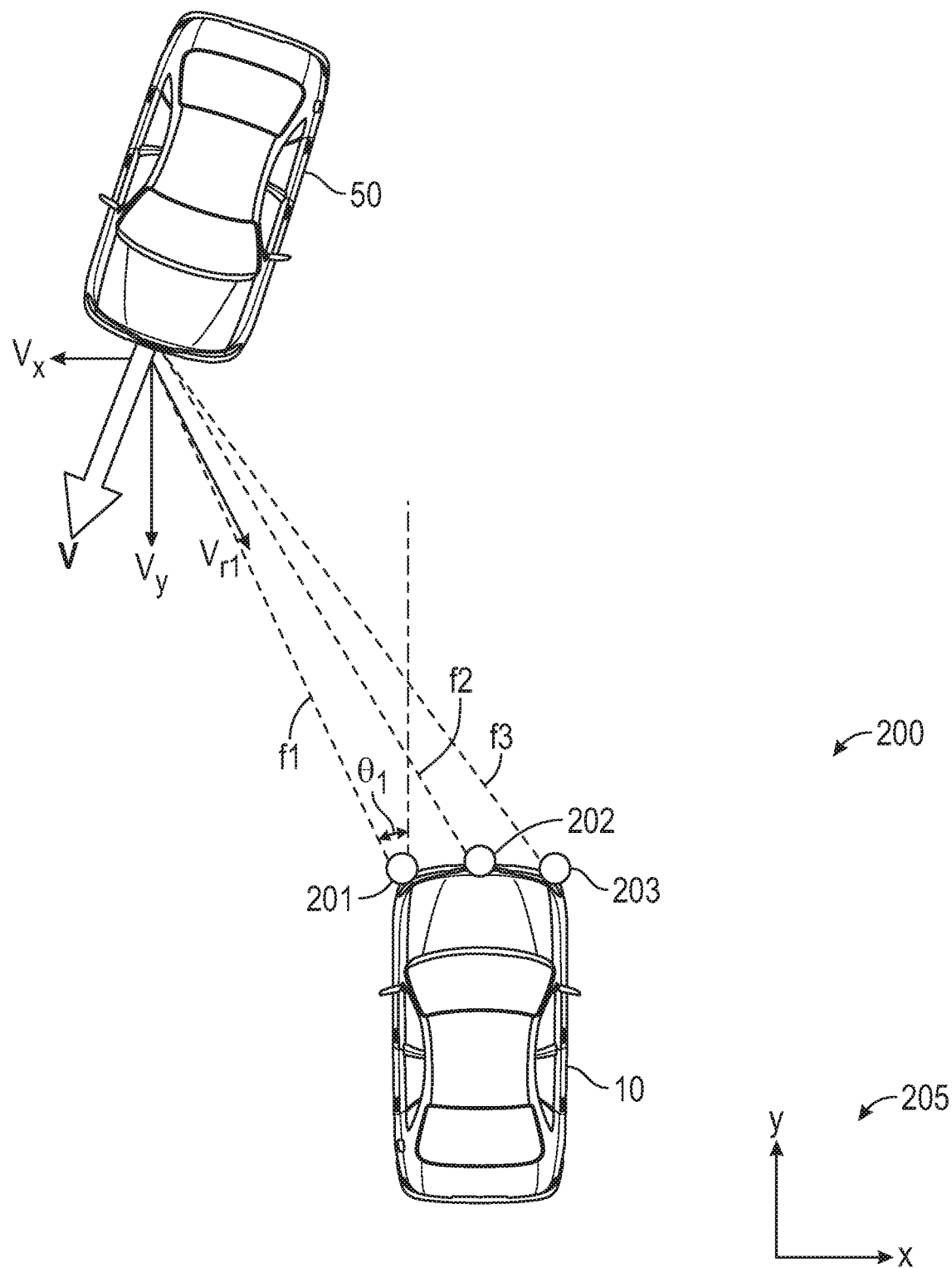
FIG. 2 illustrates operation of a multi-input multi-output (MIMO) array of radars for determining a two-dimensional velocity vector of an object with respect to the vehicle of FIG. 1.

FIG. 2 illustrates operation of a multi-input multi-output (MIMO) array 200 of radars coupled to the vehicle 10 of FIG. 1 for determining a two-dimensional velocity v of the object 50 with respect to vehicle 10. A body-centered coordinate system 205 of the vehicle 10 is shown. For illustrative purposes, the MIMO array 200 includes a first radar 201, a second radar 202 and a third radar 203. However, the MIMO array 200 can include any number N of radars, in various embodiments. Each radar (201, 202, 203) sends a test signal or source signal that is reflected off of the object 50 to create a reflected signal that is received back at the respective radar (201, 202, 203). The frequency of the reflected signal provides information on the radial component of the velocity vector of the object 50 with respect to the radars (201, 202, 203). Due to the spacing between the radars, the frequency $f_1$ of the reflected wave received at the first radar 201 is different than the frequency $f_2$ of the reflected wave received at the second radar 202 which is different than the frequency $f_3$ of the reflected wave received at the third radar 203. Thus, each radar (201, 202, 203) measures or records a different radial velocity for the object 50. The frequencies ($f_1$, $f_2$, $f_3$) are used to determine a coarse velocity estimate for the object 50, as discussed below with respect to Eqs. (1)-(4).

The frequencies ($f_1$, $f_2$, $f_3$) of the reflected signals received at respective radars (201, 202, 203) can be used to determine a radial component of the velocity of the object 50. The frequencies ($f_1$, $f_2$, $f_3$) depend on the velocity of the object 50 and the angular location of object 50 with respect to the respective radars (201, 202, 203). A relation between the received radar frequencies ($f_1$, $f_2$, $f_3$) and the velocity components ($v_x$, $v_y$) of the object 50 can be written as a matrix equation, as shown in Eq. (1):

$$\begin{bmatrix} f_1 \\ f_2 \\ \vdots \\ f_N \end{bmatrix} = \begin{bmatrix} \cos(\theta_1) & \sin(\theta_1) \\ \cos(\theta_2) & \sin(\theta_2) \\ \vdots & \vdots \\ \cos(\theta_N) & \sin(\theta_N) \end{bmatrix} \begin{bmatrix} v_x \\ v_y \end{bmatrix} \qquad \text{Eq. (1)}$$

where $v_x$ and $v_y$ are x- and y-components of the velocity v of the object 50 in the coordinate system of the vehicle 10 and $\theta_1, \theta_2, \ldots \theta_N$ are the angles of arrival of the reflection signals at the respective radars, as measured from a selected axis, e.g., from the y-axis of coordinate system 205. Eq. (1) can be rewritten in matrix notation as $$f = Hv \qquad \text{Eq. (2)}$$

where f is a frequency vector, H is a matrix including the angular relations and v is the velocity vector.

Matrix operations can be used to solve for the velocity vector to thereby obtain a coarse velocity vector estimate, as shown in Eq. (3):

$$\hat{v} = (H^T H)^{-1} H^T f \qquad \text{Eq. (3)}$$

Numerical methods for determining v are shown in Eq. (4):

$$\hat{v} = \operatorname*{argmin}_{v} \| f - Hv \|^2 \qquad \text{Eq. (4)}$$

Eqs. (3) and (4) therefore calculate a coarse velocity estimate, or a coarse estimate of the components $v_x$ and $v_y$ of the velocity vector. A coarse velocity estimate is an initial estimate of the object's velocity vector as derived from Eqs. (1)-(4). This initial estimate is used as a starting point for deriving a more precise estimate of the object's velocity using the methods discussed below with respect to Eqs. (5)-(10).

In various embodiments, a search is performed in a velocity space for a plurality of velocity hypotheses located within a defined neighborhood of the coarse velocity estimate. A velocity hypothesis is a prospective estimate of the actual velocity of the object 50 and is testing for its proximity to the actual velocity using the methods disclosed herein. In particular, a likelihood map is determined for each velocity hypothesis. The velocity hypothesis that is most likely, based on the likelihood map, is selected as being the closest or best representative of the actual velocity of the object 50. To determine which velocity hypothesis is the most likely representative, a likelihood score is calculated for each likelihood map. The velocity hypothesis having the lowest score is selected as being the closest or best representative of the actual velocity of the object 50.

Figure 3:
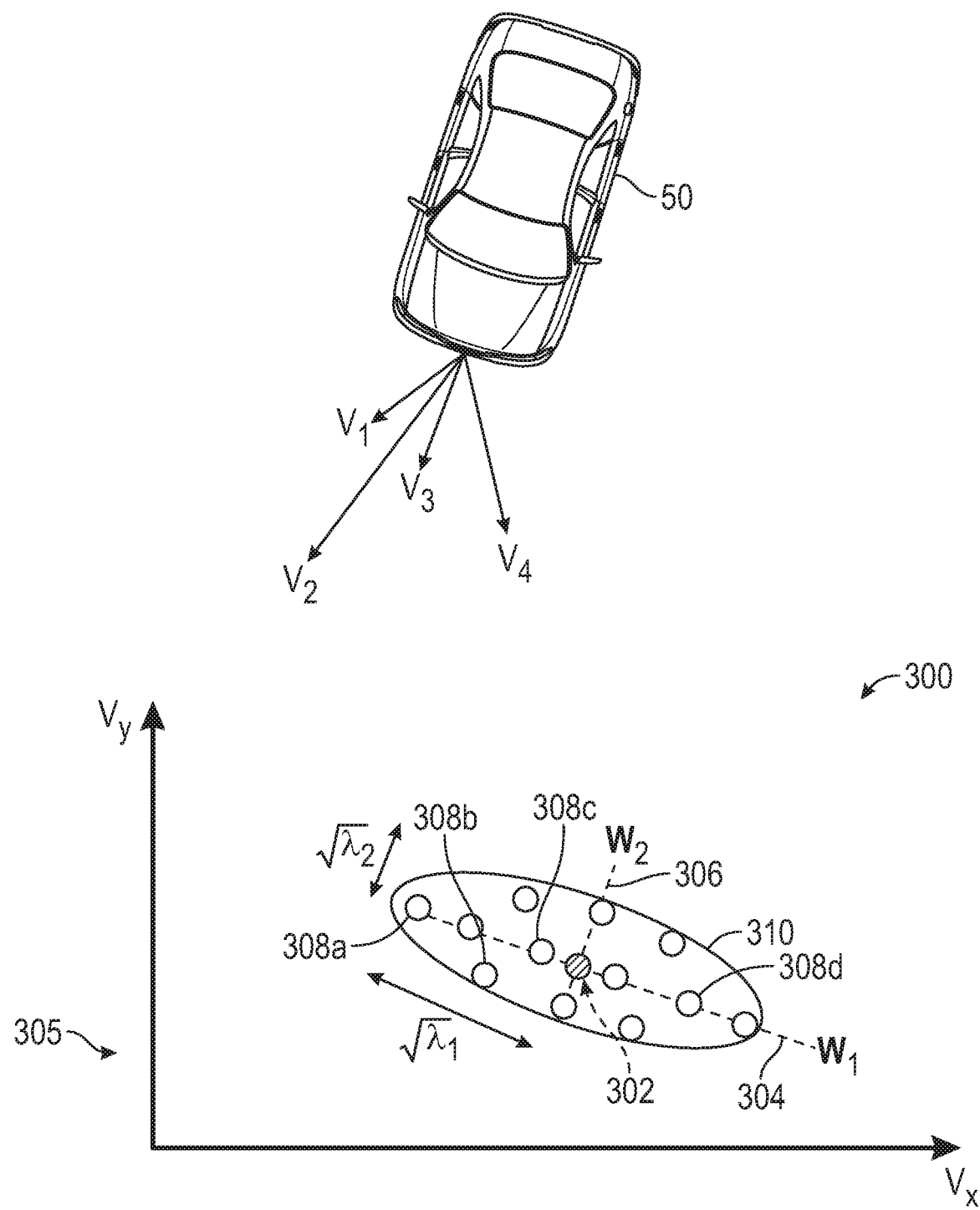
FIG. 3 shows an illustrative search grid based on the coarse velocity estimate that can be used to selected velocity hypotheses.

FIG. 3 shows an illustrative search grid 300 based on the coarse velocity estimate from which velocity hypotheses are selected. The search grid is first established over a velocity space. The search grid defines a neighborhood in the velocity space surrounding the coarse velocity estimate. The search grid is based on eigenvectors calculated from the velocity vector. In particular, a covariance matrix is determined for the coarse velocity vector, and eigenvectors are determined from the covariance matrix. The eigenvectors of the covariance matrix define the axes of an ellipse that defines the search grid. The covariance of the coarse velocity vector is shown in Eq. (5):

$$C = \operatorname{cov}\{\hat{v}\} = E\{\hat{v}\hat{v}^T\} = (H^T H)^{-1} \sigma_f^2 \qquad \text{Eq. (5)}$$

The covariance matrix therefore is defined by a standard deviation $\sigma_f^2$. The eigenvectors can be obtained using a singular value decomposition of the covariance matrix, as shown in Eq. (6):

$$C = \begin{bmatrix} u_1 & u_2 \end{bmatrix} \begin{bmatrix} \lambda_1 & 0 \\ 0 & \lambda_2 \end{bmatrix} \begin{bmatrix} w_1 \\ w_2 \end{bmatrix} \qquad \text{Eq. (6)}$$

where $w_1$ and $w_2$ are eigenvectors of the covariance matrix and $\lambda_1$ and $\lambda_2$ are eigenvalues of the covariance matrix. From a comparison of Eq. (5) and Eq. (6), the square of standard deviation of covariance matrix C is related to the eigenvalues of the covariance matrix C.

Still referring to FIG. 3, the search grid 300 is formed in a velocity space defined by $v_x$ along the abscissa and $v_y$ along the ordinate axis. A point 302 representing the coarse velocity estimate is shown in the velocity space 305. Eigenvectors $w_1$ and $w_2$ are displayed in the velocity space 305 and pass through point 302. Eigenvector $w_1$ defines a major axis 304 of an ellipse 310 centered on the point 302 and eigenvector $w_2$ defines a minor axis 306 of the ellipse 310. The length of the major axis 304 is given as the square root of its associated eigenvalue (i.e., $\sqrt{\lambda_1}$) and the length of the minor axis 306 is the square root of its associated eigenvalue (i.e., $\sqrt{\lambda_2}$). The search grid 300 is the space confined within the ellipse 310 and includes a plurality of velocity hypotheses, some of which have been labelled as 308a, 308b, 308c and 308d, for illustrative purposes. Each velocity hypothesis 308a-d is a prospective estimate of the actual velocity of the object 50, which is shown next to the velocity space 305 in FIG. 3. For instance, velocity hypothesis 308a represents velocity $v_1$ shown with respect to object 50, while velocity hypothesis 308b represents velocity $v_2$, velocity hypothesis 308c represents velocity $v_3$ and velocity hypothesis 308d represents velocity $v_4$.

Figure 4:
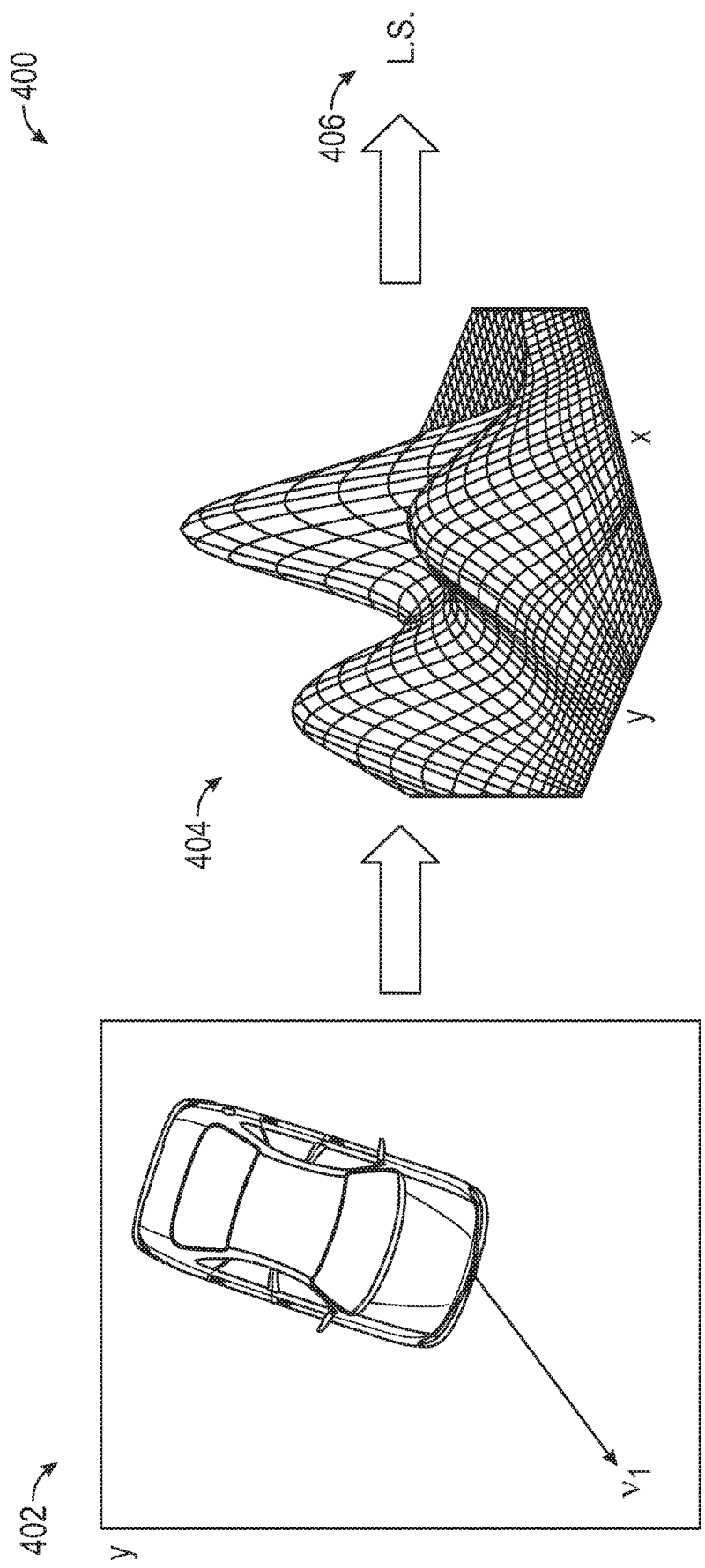
FIG. 4 illustrates a process for determining a likelihood score for a velocity hypothesis selected from the search grid of FIG. 3.

FIG. 4 illustrates a process 400 for determining a likelihood score for a velocity hypothesis selected from the search grid of FIG. 3. For illustrative purposes, velocity hypothesis $v_1$ is selected 402. A likelihood map 404 is determined for the selected velocity hypothesis $v_1$.

For the selected velocity hypotheses, a Doppler frequency for each of the radar and for a selected position (x, y) are determined that correspond to the selected velocity hypotheses. The determination includes applying a multidimensional match filter to a region of space. In particular, a filter is applied for range, Doppler and azimuth angle. The filtering of these parameters results in the likelihood map 404. A likelihood map shows a probability or likelihood for a reflective object at a location in space based on the filtering process. The likelihood map 404 is a discreet grid within (x, y) space and shows probabilities s(x, y) for each location (x, y) on the grid.

The likelihood score is a difference between an entropy term determined from the likelihood map and the energy of the pixels of the likelihood map. Calculation for the likelihood score is shown in Eq. (7):

$$\text{score} = E - \alpha \Sigma_i |s_i|^2 \quad \text{Eq. (7)}$$

where $s_i$ is an energy or probability values of the $i^{th}$ pixel and E is the entropy of the likelihood map, which is given by Eq. (8):

$$E = -\Sigma_i \gamma_i \log \gamma_i \quad \text{Eq. (8)}$$

In which the parameter $\gamma_i$ for the $i^{th}$ pixel is given by:

$$\gamma_i = \frac{|s_i|^2}{\Sigma_i |s_i|^2} \quad \text{Eq. (9)}$$

The coefficient $\alpha$ of Eq. (6) is given by $$\alpha = \frac{0.25 \log(N_{pixels})}{\max_k (Energy_k)} \quad \text{Eq. (10)}$$

in which $N_{pixels}$ in the number of pixels in the likelihood map and $Energy_k$ is the energy of the $k^{th}$ pixel.

The likelihood score is thus calculated for the velocity hypotheses using the methods discussed with respect to Eqs. (5)-(10). The velocity hypothesis having the lowest or minimal score is then selected as being representative of the actual velocity of the object. It should be noted that a metric that is the opposite of Eq. (7) could be used, resulting in the velocity hypothesis having the highest or maximal score as being selected as representative of the actual velocity of the object. In either case, an extremum score is used to select the velocity hypothesis.

Figure 5:
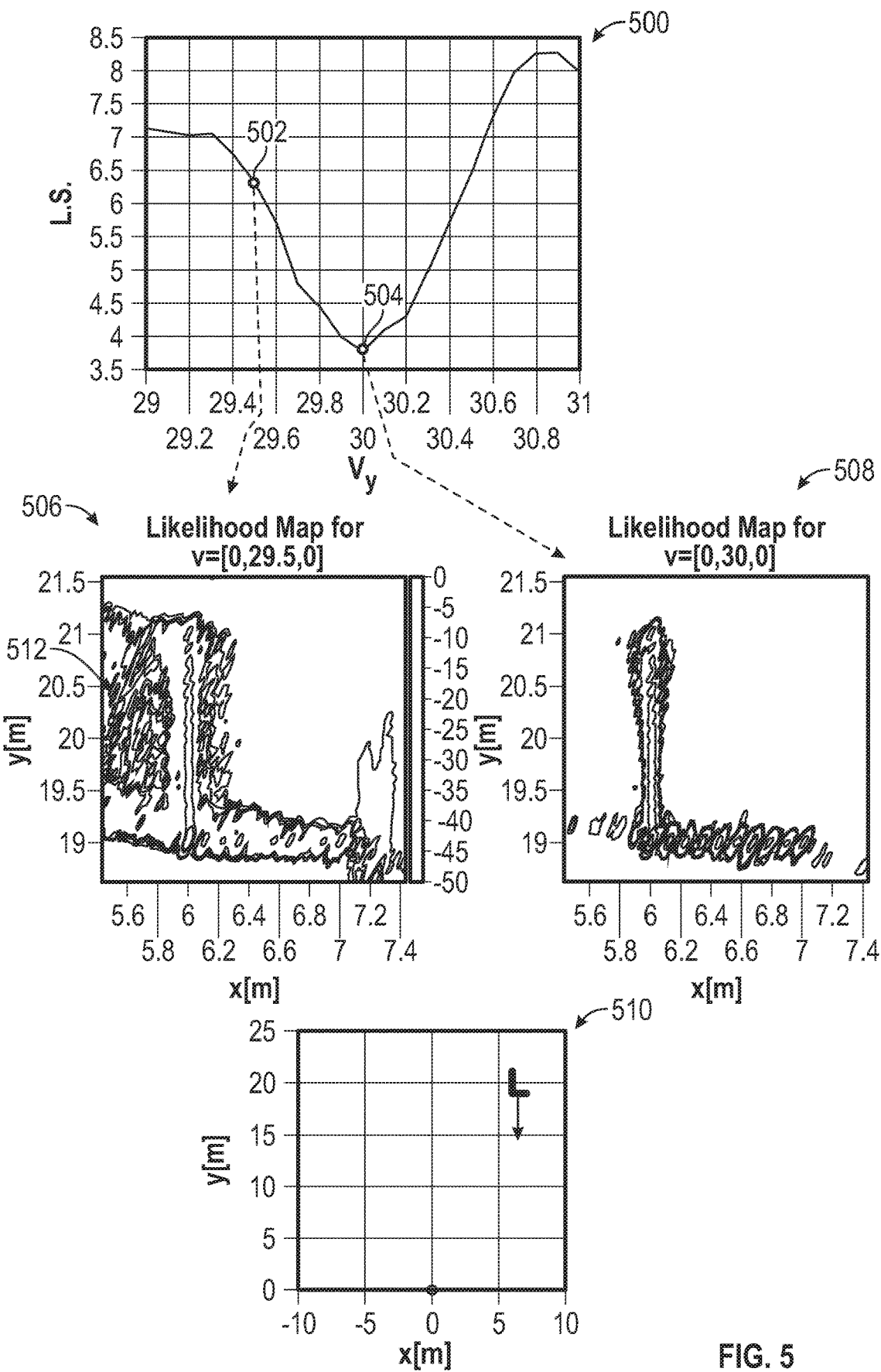
FIG. 5 shows a plot of a likelihood score function for a plurality of velocity hypotheses selected from the search grid of FIG. 3.

FIG. 5 shows a plot 500 of a likelihood score function for a plurality of velocity hypotheses selected from the search grid 300 of FIG. 3. An actual velocity which the velocity hypotheses are approximating is shown in plot 510. The actual velocity of the object 50 is $v_y$=30 meters/second ($v_x$=0). Two likelihood scores have been selected from plot 500 and the related likelihood maps are shown. Likelihood score 502 is related to likelihood map 506. Likelihood score 504 is related to likelihood map 508.

Likelihood map 506 includes various extraneous signals and false velocity readings, as indicated by pixels 512. These false readings add to the value of the likelihood score 502. On the other hand, the likelihood map 508 for the velocity hypothesis shows a sharp set of velocity peaks and few false signals. Thus, the likelihood score 504 for the likelihood map is lower than the likelihood score 502. As shown, likelihood score 504 is a minimum or lowest score that indicates a maximal likelihood for the velocity hypothesis related to the lowest score. Thus, the velocity hypothesis having the lowest score is a best approximation to the true velocity of the object 50.

Figure 6:
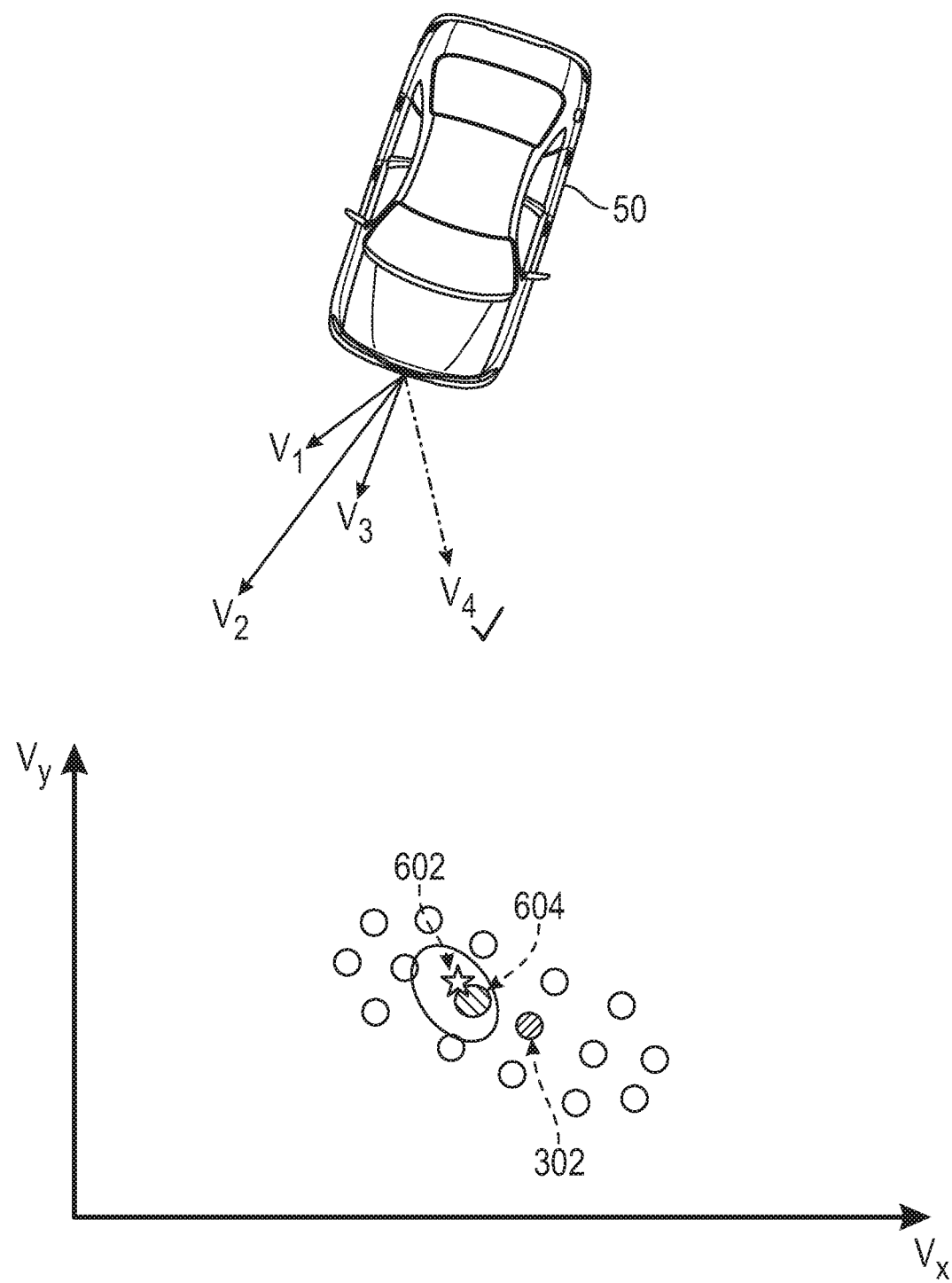
FIG. 6 shows the velocity hypotheses from the search grid of FIG. 3.

FIG. 6 shows the velocity hypotheses from the search grid of FIG. 3 The selected velocity hypothesis 604 having the lowest score as determined using the methods disclosed herein is highlighted. The selected hypothesis is a closest approximation to the true velocity value 602. For a discreet velocity space, the selected velocity hypothesis 604 can still be only an approximation to the true velocity 602. However, the distance between the selected velocity hypothesis 604 and the true velocity value 602 can be reduced with increased grid density.

Figure 7:
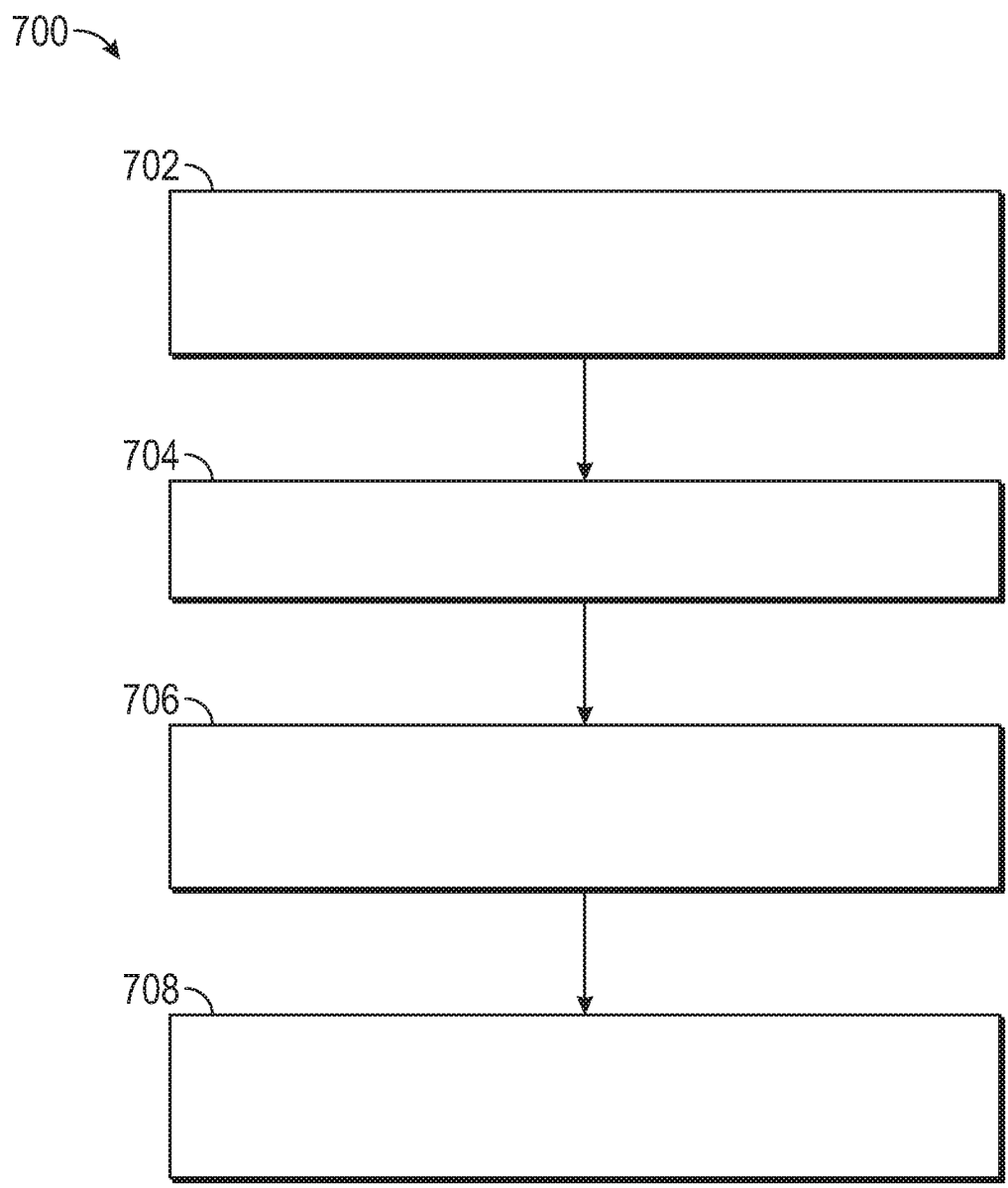
FIG. 7 shows a flowchart illustrating a method of determining a true or actual velocity of an object using the methods disclosed herein.

FIG. 7 shows a flowchart 700 illustrating a method of determining a true or actual velocity of an object using the methods disclosed herein. In box 702, a coarse velocity estimate is determined using a Doppler frequency measurements obtained at a plurality of radar spaced apart from each other. In box 704, the coarse velocity estimate is used to define dimensions of a search grid in velocity space. In box 706, velocity hypotheses are selected from the search grid and a likelihood score is calculated from the selected velocity hypotheses. In box 708, a velocity hypothesis having a lowest score is selected as having a maximal likelihood. In other words the velocity hypothesis having the lowest score is considered to the closest estimate of the velocity of the object.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of estimating operating a vehicle, comprising:

obtaining a plurality of velocity hypotheses based on a coarse estimate of a velocity of an object with respect to the vehicle;

determining a likelihood map for each of the plurality of velocity hypotheses;

determining a likelihood score for each of the plurality of velocity hypotheses from the likelihood maps, the likelihood score of a velocity hypothesis being a difference between an entropy term of the likelihood map and a sum of probabilities for the likelihood map;

selecting, as an estimate of the velocity of the object, the velocity hypothesis having an extremum likelihood score from the plurality of velocity hypotheses; and operating the vehicle to navigate with respect to the object based on the selected velocity hypothesis.

2. The method of claim 1, wherein the plurality of velocity hypotheses are within an ellipse having eigenvectors of a covariance matrix of the coarse estimate as axes.

3. The method of claim 1, wherein the sum of probabilities is a sum of a square of probabilities for each pixel of the likelihood map.

4. The method of claim 1, further comprising selecting the velocity hypothesis for which the likelihood score is a lowest of the likelihood scores.

5. The method of claim 1, further comprising:
obtaining a measurement of Doppler frequency for the object at each of a plurality of spaced apart radars; and
determining the coarse estimate of the velocity of the object from the Doppler frequencies.

6. The method of claim 5, further comprising determining the coarse estimate of velocity from the Doppler frequencies and angular locations of the object with respect to each of the plurality of spaced-apart radars.

7. The method of claim 1, further comprising generating a search grid from the coarse estimate and selecting the velocity hypotheses from an area within the search grid.

8. A system for operating a vehicle, comprising:
a plurality of radars associated with the vehicle for providing a coarse estimate of a velocity of an object with respect to the vehicle;
a processor configured to:
obtain a plurality of velocity hypotheses based on the coarse estimate of the velocity of the object;
determine a likelihood map for each of the plurality of velocity hypotheses;
determine a likelihood score for each of the plurality of velocity hypotheses from the likelihood maps, the likelihood score of a velocity hypothesis being a difference between an entropy term of the likelihood map and a sum of probabilities for the likelihood map;
select, as an estimate of the velocity of the object, the velocity hypothesis having an extremum likelihood score from the plurality of velocity hypotheses; and
operate the vehicle to navigate with respect to the object based on the selected velocity hypothesis.

9. The system of claim 8, wherein the processor obtains the plurality of velocity hypotheses from within an ellipse having eigenvectors of a covariance matrix of the coarse estimate as axes.

10. The system of claim 8, wherein the sum of probabilities is a sum of a square of probabilities for each pixel of the likelihood map.

11. The system of claim 8, wherein the processor further chooses the velocity hypothesis for which the likelihood score is a lowest of the likelihood scores.

12. The system of claim 8, wherein the plurality of radars obtain measurements of Doppler frequency for the object, and the processor is configured to determine the coarse estimate of the velocity of the object from the Doppler frequencies.

13. The system of claim 12, wherein processor is further configured to determine the coarse estimate of velocity from the Doppler frequencies and angular locations of the object with respect to each of the plurality of spaced-apart radars.

14. The system of claim 8, wherein the processor is configured to generate a search grid from the coarse estimate and select the velocity hypotheses from an area within the search grid.

15. A vehicle, comprising:
a plurality of radars associated with the vehicle for providing a coarse estimate of a velocity of an object with respect to the vehicle; and
a processor configured to:
generate a search grid based on the coarse estimate;
generate a plurality of velocity hypotheses within the search grid based on the coarse estimate;
determine a likelihood map for each of the plurality of velocity hypotheses;
determine a likelihood score for each of the plurality of velocity hypotheses from the likelihood maps, the likelihood score of a velocity hypothesis being a difference between an entropy term of the likelihood map and a sum of probabilities for the likelihood map;
select, as an estimate of the velocity of the object, the velocity hypothesis having an extremum likelihood score from the plurality of velocity hypotheses; and
operate the vehicle to navigate with respect to the object based on the selected velocity hypothesis.

16. The vehicle of claim 15, wherein the processor is further configured to generate the plurality of velocity hypotheses within an ellipse on the search grid, the ellipse having eigenvectors of a covariance matrix of the coarse estimate as axes.

17. The vehicle of claim 15, wherein the sum of probabilities is a sum of a square of probabilities for each pixel of the likelihood map.

18. The vehicle of claim 15, wherein the plurality of radars obtain measurements of Doppler frequency for the object, and the processor is configured to determine the coarse estimate of the velocity of the object from the Doppler frequencies.

19. The vehicle of claim 16, wherein processor is further configured to determine the coarse estimate of velocity from the Doppler frequencies and angular locations of the object with respect to each of the plurality of spaced-apart radars.

20. The vehicle of claim 15, wherein the processor is configured to generate a search grid from the coarse estimate and select the velocity hypotheses from an area within the search grid.

* * * * *